United States Patent Office 2,852,222
Patented Sept. 16, 1958

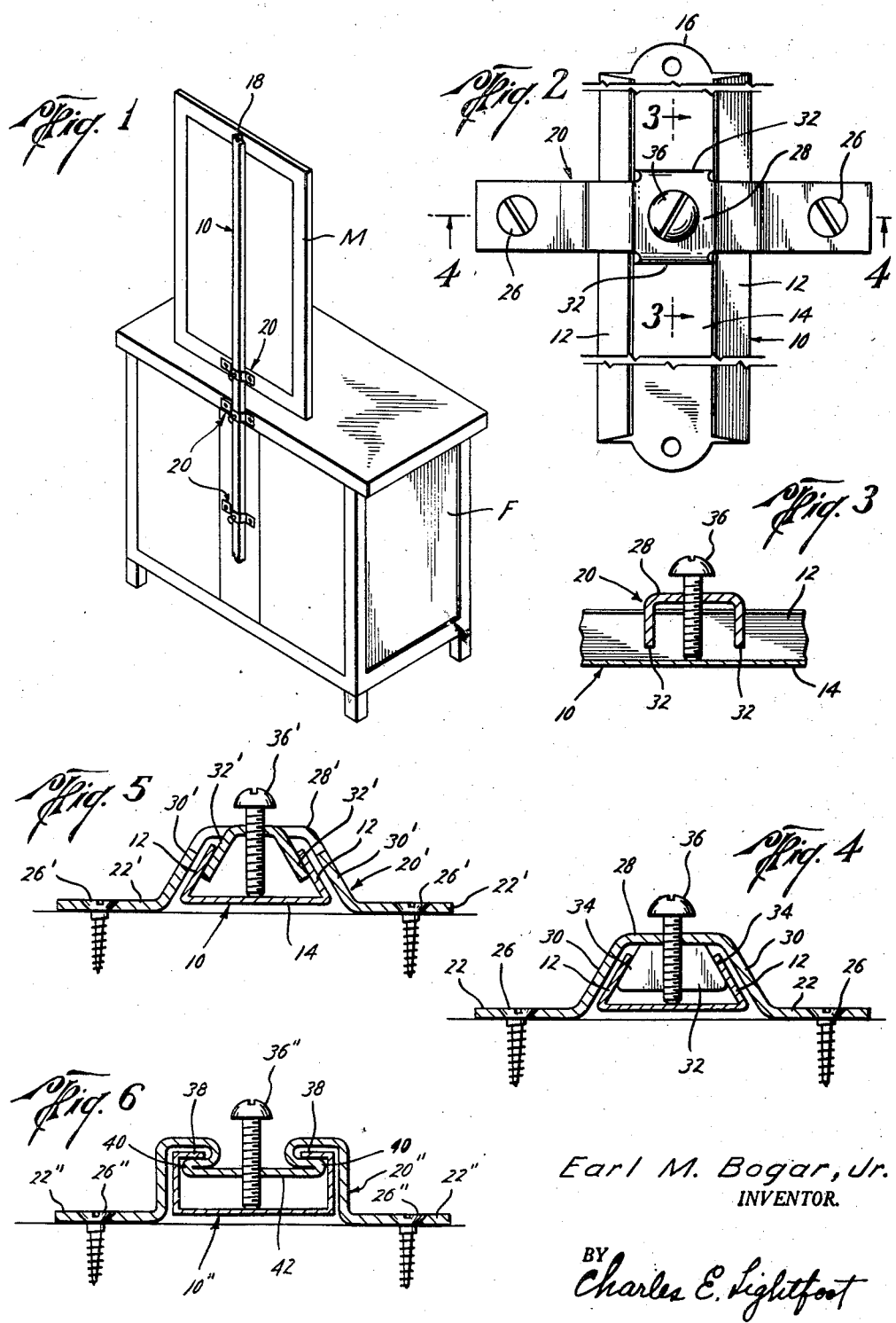

2,852,222

MIRROR SUPPORT

Earl M. Bogar, Jr., Houston, Tex.

Application June 13, 1955, Serial No. 515,053

5 Claims. (Cl. 248—295)

This invention relates to a mirror support and more particularly to a device for connecting a mirror to a dresser, bureau, or other article of furniture to support the mirror in an upright position thereon.

As commonly constructed, such articles of furniture as vanities, dressers, bureaus and the like are provided with mirrors which are usually disposed along the rear edge of the furniture and extending upwardly therefrom in an upright position. The mirrors are often attached to the furniture by means of uprights secured to the back of the furniture and extending upwardly along the back of the mirror and secured thereto, as by means of screws.

In shipping articles of furniture of this kind the mirrors are removed and packed separately, both because of the likelihood that they may become broken and for the purpose of conserving space. The removal and replacement of the mirrors thus presents a task requiring considerable skill and the expenditure of much time and labor, thereby becoming a substantial item of expense.

The present invention has for an important object the provision of a mirror support having parts which are easily secured to the mirror and to the article of furniture and which may be easily and quickly assembled to support the mirror in place.

Another object of the invention is to provide a mirror support made in several parts adapted to cooperate to adjustably support a mirror on an article of furniture, and having means for clamping the parts together, without exerting any force on the fastening means by which the parts are secured to the mirror and furniture which would tend to loosen the fastenings.

A further object of the invention is the provision of a mirror support which is constructed for use with mirrors of widely differing sizes and by which the same may be easily and quickly applied to different types of furniture.

Another object of the invention is to provide a mirror support whose parts are of simple design and rugged construction, and which are economical in manufacture.

The above and other important objects and advantages of the invention may best be understood from the following detailed description, constituting a specification of the invention when considered in conjunction with the annexed drawings, wherein—

Figure 1 is a perspective view illustrating a preferred embodiment of the invention applied to a mirror and an articles of furniture and showing the manner in which the invention operates to adjustably support a mirror;

Figure 2 is a fragmentary, rear, elevational view, on an enlarged scale, illustrating a preferred embodiment of the invention and showing details of construction and the manner in which the parts are assembled;

Figure 3 is a cross-sectional view taken along the line 3—3 of Figure 2, looking in the direction indicated by the arrows;

Figure 4 is a cross-sectional view, taken along the line 4—4 of Figure 2, looking in the direction indicated by the arrows;

Figure 5 is a view, similar to that of Figure 4, illustrating a somewhat modified form of the bracket of the invention; and Figure 6 is a view similar to that of Figure 4, illustrating a further modification of the invention.

Referring now to the drawings in greater detail the mirror support of the invention in its preferred embodiment, as illustrated in Figures 1 to 4, inclusive, includes an upright or standard 10 of general channel shape in cross-section, whose flanges 12 converge in a direction away from the web or bottom wall 14 of the standard. The standard is provided with an opening 16 in its bottom wall near its upper end and has a similar opening near its lower end for the reception of a screw 18 by which one end of the standard may be secured to the upper margin of the back of the frame of a mirror M which is to be adjustably supported on an article of furniture F, such as a dresser, bureau, vanity, or the like.

For the purpose of adjustably securing the standard to the article of furniture, the mirror support includes brackets 20, 20 attached at vertically spaced points on the back of the article of furniture F. An additional bracket 20 is also attached to the lower margin of the frame of the mirror, as seen in Figure 1.

Each of the brackets 20 is preferably formed in one piece having oppositely extending arms 22, 22 each provided with an opening through which a screw 26 may be extended for attaching the brackets to the mirror frame and article of furniture. Each bracket is formed with a central portion of generally channel shape in cross-section having a bottom wall portion 28 and outwardly flaring side wall portions 30. Wings or lugs 32 are provided on the brackets, which may be formed as extensions of the bottom wall portions bent outwardly from the bottom wall portion at substantially right angles thereto. The lugs or wings 32 are of wedge shape having side edges 34 conforming to the slope of the side walls 12 of the standard 10, and the lugs are of a size to be inserted at either end of the standard between the side walls 12. The bottom wall portion 28 has a central, screw-threaded opening for the reception of a set screw 36.

In making use of the invention, constructed as described above, the standard 10 is secured to the upper margin of the back of the frame of the mirror M by a screw extending through one of the end openings 16, the outer surface of the bottom wall 14 of the standard being in contact with the back of the mirror, and the standard opening away from the same, as best seen in Figure 1. A bracket 20 is then positioned on the standard by inserting the wings or lugs 32 thereof between the side walls 12 of the standard at the lower end thereof and moving the bracket along the standard to the lower margin of the back of the frame of the mirror and securing the arms of the bracket to the mirror frame by screws 26.

Two brackets 20 are also attached by their arms 22 at vertically spaced points on the back of the article of furniture F, these brackets being arranged in vertical alignment in the manner seen in Figure 1. The lower end of the standard 10 may then be inserted through the brackets on the article of furniture, with the wings 32 thereof extending between the side walls 12 and the standard moved vertically until the mirror is at the desired location above the top of the article of furniture. The set screws 36 of the two brackets on the furniture are then tightened to hold the standard against vertical movement to support the mirror in place. The plane of the bottom wall portion 28 of the brackets 20 is spaced from the plane of the arms 22 thereof a greater distance than the depth of the standard 10, and the set screws 36 are of a length to be engaged with the bottom wall 14 of the standard so that upon tightening the screws, it will be seen that the standard will be moved away from the bottom wall portions of the brackets toward the back of the article of furniture, and the edge portions 34 of the lugs or wings 32 will engage the inner faces of the side walls 12 of the standard to clamp the standard against vertical movement in the brackets. When the standard is thus securely clamped to the brackets the bottom wall 14 of the standard will be out of contact with the back of the article of furniture, so that no force is exerted on the brackets by tightening screws 36 which would tend to pull the screws 26 out of the furniture. Thus, there is no tendency for the brackets to become loosened by the clamping of the standard thereto.

Screws 36 may be of a length such that the heads of the screws are nearly in contact with the bottom wall portions 28 of the brackets when fully tightened, so that the screws project only a short distance beyond the brackets, in order to reduce the danger of damage to walls, or the like, due to contact with the screw heads.

In Figure 5 a somewhat modified form of the bracket of the invention is illustrated wherein lugs 32' are formed by cutting and pinching or otherwise displacing portions of the bottom wall portion 28' of the bracket, these lugs being bent away from the bottom wall portion and diverging therefrom to conform to the slope of the side walls 12 of the standard 10 in a manner similar to the edge portions 34 of the wings 32 previously described. In other respects this form of the invention is similar in construction and manner of application to the form described in connection with Figures 1 to 4.

A further modification of the invention is illustrated in Figure 6 of the drawings, wherein the standard 10" is of channel shape, the side walls 12" thereof having inwardly bent marginal portions 38, and the bracket 20" being formed with rebent portions 40 positioned for engagement with the inner faces of the marginal portions 38 of the standard when the standard is inserted in the bracket. The bracket also has a web portion 42 extending between and connecting the rebent portions 40 and which is provided with a centrally disposed screw-threaded opening for a set screw 36". In other respects this form of the invention is applied and used in a manner similar to those previously described. The standard 10" is inserted through the brackets 20" and the screws 36" tightened to force the standard toward the article of furniture until the rebent portions 40 are clampingly engaged with the marginal portions 38 to securely hold the standard against longitudinal movement through the brackets.

It will thus be seen that the invention provides a support for a mirror or other similar article whereby the same may be adjustably attached to an article of furniture and by which a strong and durable support is effected.

While the invention has been disclosed herein in connection with certain specific embodiments of the same, it will be understood that this is intended by way of illustration only, and that numerous changes can be made in the construction and arrangement of the various parts without departing from the spirit of the invention or the scope of the appended claims.

Having thus clearly shown and described the invention, what is claimed as new and desired to secure by Letters Patent is:

1. A support for removably and adjustably mounting a mirror over an article of furniture comprising an elongated standard of generally channel shape in cross-section having a bottom wall and side walls formed with portions whose inner faces are positioned in overlying spaced relation to said bottom wall and whose edges are spaced apart, means for securing said standard to a mirror with the lower end portion of the standard extending beyond the lower edge of the mirror, and brackets of generally U-shape having bottom portions extending over said standard outwardly of the side walls of the standard and side portions formed with outturned end portions positioned to lie against and adapted to be secured to an upright portion of an article of furniture, clamp portions on said brackets positioned to extend between and engage said inner faces with said bottom wall of said standard positioned in outwardly spaced relation to said article of furniture and screw means threadably carried by the brackets in position to be engaged with said bottom wall to urge the standard away from said bottom portions to clampingly engage said clamp portions with said inner faces.

2. A support for removably and adjustably mounting a mirror over an article of furniture comprising an elongated standard of generally channel shape in cross-section having a bottom wall and side walls formed with marginal portions extending toward each other in outwardly spaced relation to said bottom wall and whose edges are spaced apart, means for securing said standard to a mirror with the lower end portion of the standard extending beyond the lower edge of the mirror, and brackets of generally U-shape having bottom portions extending over said standard and side portions formed with outturned end portions positioned to lie against and adapted to be secured to an upright portion of an article of furniture, clamp portions on said brackets positioned to extend between and engage the inner faces of said marginal portions of said standard to hold said standard with said bottom wall in out of contact relation to said article of furniture, and screw means threadably carried by the brackets in position to be extended into engagement with said bottom wall to urge the standard away from said bottom portions to clampingly engage said clamp portions with the side walls of the brackets.

3. A support for removably and adjustably mounting a mirror over an article of furniture comprising an elongated standard of generaly channel shape in cross-section having a bottom wall and side walls formed with inturned marginal portions spaced from said bottom wall and whose edges are spaced apart, means for securing said standard to a mirror with the lower end portion of the standard extending beyond the lower edge of the mirror, and brackets of generally U-shape having bottom portions extending over said standard outwardly of said inturned marginal portions and side portions formed with outturned end portions positioned to lie against and adapted to be secured to an upright portion of an article of furniture, clamp portions on said brackets positioned to extend between and engage the inner faces of said inturned marginal portions with said bottom wall of said standard positioned in outwardly spaced relation to said article of furniture, and screw means threadably carried by the brackets in position to be engaged with said bottom wall to urge the standard away from said bottom portions to clampingly engage said clamp portions with said inturned portions.

4. A support for removably and adjustably mounting a mirror over an article of furniture comprising an elongated standard of generally channel shape in cross-section having a bottom wall and side walls converging away from said bottom wall and whose edges are spaced apart, means for securing the standard to a mirror with the lower end portion of the standard extending beyond the lower edge of the mirror, and brackets of generally U-shape having bottom portions extending over said standard outwardly of the edges of said side walls and side portions formed with outturned end portions positioned to lie against and adapted to be secured to an upright portion of an article of furniture, said brackets having vertically spaced clamp portions positioned to extend between said side walls and shaped for engagement with the inner faces of said side walls to hold said standard with said bottom wall of said standard in out of contact relation with said article of furniture, and screw means threadably carried by the brackets in position to be engaged with said bottom wall to urge said standard away from said bottom portions to clampingly engage said clamp portions with said inner faces.

5. A support for removably and adjustably mounting a mirror over an article of furniture comprising an elongated standard of generally channel shape in cross-section having a bottom wall and side walls formed with portions positioned in overlying spaced relation to said bottom wall and whose edges are spaced apart, means for securing said standard to a mirror with the lower end portion of the standard extending below the lower edge of the mirror, and brackets of generally U-shape having bottom portions disposed outwardly of and overlying said side wall portions and said portions formed with outturned end portions positioned to lie against and adapted to be secured to an upright portion of an article of furniture, vertically spaced clamp portions formed on said bottom portions extending between and engageable with the inner faces of said side wall portions to hold said standard with said bottom wall in spaced relation to said article of furniture, and screw means threadably carried by said brackets in position to be engaged with said bottom wall to urge said standard away from said bottom portions to clampingly engage said clamp portions with said inner faces.

References Cited in the file of this patent

UNITED STATES PATENTS

| | | |
|---|---|---|
| 980,376 | Wickliffe | Jan. 3, 1911 |
| 2,335,896 | Anderson | Dec. 7, 1943 |
| 2,607,553 | Garrett | Aug. 19, 1952 |
| 2,688,901 | Haugaard | Sept. 14, 1954 |
| 2,694,543 | Norris | Nov. 16, 1954 |